United States Patent
Banke et al.

[11] Patent Number: 5,957,318
[45] Date of Patent: Sep. 28, 1999

[54] BREWING VESSEL WITH MANHOLE OPENING

[75] Inventors: Friedrich Banke, Inning am Holz; Harald Gratzer, Berglern; Rudolf Flossmann, Langenbach, all of Germany

[73] Assignee: Anton Steinecker Maschinenfabrik GmbH, Freising/Attaching, Germany

[21] Appl. No.: 09/005,084

[22] Filed: Jan. 9, 1998

[30] Foreign Application Priority Data

Jan. 14, 1997 [DE] Germany ............. 297 00 558 U

[51] Int. Cl.⁶ ..................... B65D 45/00; C12C 13/02
[52] U.S. Cl. .............. 220/263; 220/291; 220/831; 220/844; 292/256.5
[58] Field of Search ........................ 220/263, 291, 220/293, 297, 300, 319, 377, 602, 831, 833–835, 843, 844, 912, 573.1, 682, 683; 215/218, 221, 222, 274; 105/377.01, 377.11; 292/256.5, 256.6; 99/275–278

[56] References Cited

U.S. PATENT DOCUMENTS

| | | | |
|---|---|---|---|
| 1,848,954 | 3/1932 | Jarvis | 220/319 |
| 2,022,868 | 12/1935 | Nelson | 220/319 X |
| 2,431,905 | 12/1947 | Anicetti | 220/293 |
| 2,583,073 | 1/1952 | Ahlborn | 220/291 |
| 3,076,577 | 2/1963 | Craig | 220/297 |
| 3,488,883 | 1/1970 | Clements et al. | 220/291 X |
| 3,951,300 | 4/1976 | Kalasek | 220/319 X |
| 4,466,551 | 8/1984 | Leung | 220/293 |
| 5,064,082 | 11/1991 | Lombardi et al. | 220/300 X |
| 5,072,850 | 12/1991 | Gagnon et al. | 220/300 |
| 5,628,423 | 5/1997 | Yoshino | 220/319 |
| 5,727,704 | 3/1998 | Glynn | 215/221 X |
| 5,768,976 | 6/1998 | Suk | 220/293 X |

FOREIGN PATENT DOCUMENTS

| | | |
|---|---|---|
| 91 11 870 | 1/1992 | Germany . |
| 50-106023 | 8/1975 | Japan . |
| 62-59518 | 4/1987 | Japan . |
| 2-144565 | 12/1990 | Japan . |
| 6-507102 | 8/1994 | Japan . |
| 8-75002 | 3/1996 | Japan . |

*Primary Examiner*—Stephen K. Cronin
*Assistant Examiner*—Nathan Newhouse
*Attorney, Agent, or Firm*—Seed and Berry LLP

[57] ABSTRACT

The present invention relates to a brewing vessel comprising a manhole opening which is closable by a lockable lid. To obtain a simple locking mechanism which, in particular, does not create any unaccessible space, the locking ring is supported on the outside of the frame and comprises at least one locking bolt which cooperates with a recess formed in a collar of the lid.

9 Claims, 5 Drawing Sheets

BREWING VESSEL WITH MANHOLE OPENING

TECHNICAL FIELD

The present invention relates to a brewing vessel comprising at least one manhole opening which is surrounded by a frame and is closable with a lid which is lockable with the aid of a locking means that comprises a rotatable locking ring.

BACKGROUND OF THE INVENTION

Manhole openings which are closable by lids are generally used on brewing vessels, such as brewing kettles, whirlpools, lauter tuns, or the like. An operator can enter through the manhole opening into the brewing vessel by opening the lid and can perform maintenance or control work in the vessel. After having completed such work, the operator can leave the brewing vessel through the manhole opening. Before the brewing vessel is put into operation, the lid is again sealingly closed by a locking means. An inspection glass is normally inserted into the lid, so that the interior of the brewing vessel can be inspected without the lid being opened.

In a brewing vessel which is known from German Utility Model G 91 11 870, the locking means of the lid comprises a locking ring which is slidably arranged on the inside of the lid and which is rotatably supported by bolts secured to the inside of the lid and which cooperates with ramps that are arranged on the inside of the frame.

Although such a solution has proved to be successful in practice, it is nevertheless in need of improvement in some respects. To be more specific, the parts of the locking means which are arranged on the inside of the lid form unaccessible spaces or portions, so that deposits may accumulate there during operation of the brewing vessel, the deposits being not easily removable by cleaning. Moreover, the size of an inspection vessel to be mounted in the lid is limited by the locking ring positioned thereunder and the view into the interior of the brewing vessel is impaired by the locking ring.

SUMMARY OF THE INVENTION

Starting from such a prior art, it is the object of the present invention to provide a brewing vessel in which the lid which closes the manhole opening can be locked in a constructionally simple manner without the creation of unaccessible spaces or portions. Moreover, the view into the interior of the brewing vessel should not be impaired by parts of the locking means in the case of a lid comprising a viewing window.

In a brewing vessel of the above-mentioned type, this object is achieved in that the locking ring is supported on the outside of the frame and comprises at least one locking bolt which cooperates with a recess formed in a collar of the lid.

Hence, with such a solution the locking ring rests on the outside of the frame, so that the interior, i.e. the inner diameter of the frame, remains free of parts of the locking means. The locking means does not cooperate with parts inside the frame, but cooperates with the collar of the lid which is arranged further to the exterior, so that not only unaccessible spaces which would be difficult to clean are avoided in the interior of the frame, but an easy view into the interior of the brewing vessel is also ensured even in cases where an inspection glass is arranged in the lid.

In a further, very advantageous development of the invention, the locking ring consists of two rings which can be screwed to each other and which form a U-shaped receiving portion for a bearing ring which, in turn, rests on the outer wall of the frame in a complementary annular groove. This way of supporting the locking ring is very simple. A radially inwardly oriented annular groove which has inserted thereinto a bearing ring which may, for instance, be made of Teflon or a suitable stable plastic material is provided on the outside of the frame. This bearing ring may be cut from band-like material and inserted into the groove. The bearing ring is held in its groove by putting the two rings forming the locking ring thereover. The locking ring itself also receives the bearing ring with a complementary U-shaped receiving portion which is also formed on said ring, so that the locking ring is rotatably supported and guided on the frame via the bearing ring. A constructionally very simple support of the locking ring is thereby achieved.

In a further advantageous development of the invention, the recess comprises an inlet portion which is oriented in the closing direction and downwardly open and which is followed by a closed locking section which is oriented in the circumferential direction. Hence, the recess forms a kind of bayonet locking together with the locking bolt, with the locking bolt running into the inlet portion during closing of the lid and the bolt then passing via the locking section into an end stop position by rotating the locking ring, in which end position the lid is then firmly locked.

When in a further development of the invention the boundary surface of the recess which cooperates with the locking bolt is designed as a ramp which slightly ascends towards the locking end position and which ends in a locking recess, this has the effect that upon rotation of the locking ring the bolt runs along the ramp, thereby pressing the lid more and more into its locking position until the final locking position is reached. The locking recess which is provided in the locking position has the effect that whenever the brewing vessel is under pressure, a mechanical opening is virtually no longer possible because the lid presses against the bolt which is positioned in the locking recess, thereby creating a positive connection between locking ring and lid, so that an opening operation is not possible as long as the brewing vessel is under some pressure—even if the pressure is a slight one.

According to a further advantageous development of the invention a limit switch which with a switching pin cooperates with a locking ring is arranged on the outside of the frame. It is advantageous when the locking ring comprises a switching surface which operates the switching pin upon rotation from the closing position into the opening position before the opening position is reached.

This solution has the effect that the switching pin is not operated at a time as late as the opening of the lid, but is already operated when the locking ring is moved from its locking position towards the opening position. Since the switching pin is operated before the opening position is reached, it is ensured that the machine parts which are operated via the limit switch, for example agitator, spraying equipment, or the like, in the interior of the brewing vessel, are reliably switched off even before the lid can be opened at all. Operational safety is considerably enhanced thereby.

In a further advantageous development, in the area of the bearings for the lid at least one locking disc is rotatingly arranged with the lid during opening and closing, the rotating disc comprising a locking surface which in the opening position of the locking ring enters into a groove formed therein when the lid is being opened, and thus blocks a reversed rotation of the locking ring.

Hence, this locking disc has the effect that after the beginning of the opening movement of the lid, i.e., when the lid is lifted, the locking disc enters with part of its surface into a groove on the locking ring and thus prevents a possible reversed rotation of the locking ring. This ensures that the locking ring which operates the limit switch in the opening position cannot be rotated into a position in which the limit switch is again released as long as the lid is opened. Hence, the lid must first be dosed so that the locking ring can be brought into the locking position again and then releases the limit switch so that the units in the interior of the brewing vessel can then be further processed again.

It is also of advantage when the locking disc comprises an abutment nose which defines the maximum opening position by abutment on the bottom side of the locking ring. Hence, the locking disc has two functions. A separately constructed stop is thus not needed.

In a further advantageous development of the invention, a surrounding seal is arranged on the edge of the frame at the lid side, the seal being designed such that upon an increase in pressure in the interior of the brewing vessel the sealing force is increased between lid and seal. Such seals ensure that reliability and thightness of the lid do not diminish in case of an increased inner pressure prevailing in the interior of the brewing vessel, but quite to the contrary are increased. Typical seals which are suited for this purpose are lip seals which have a sealing lip which abuts on the bottom side of the lid and is pressed with an increasing pressure more and more against the lid.

Finally, penetrations which are in alignment in the locking position are formed in the collar of the lid and in the locking ring and a plug-in locking cylinder can lockably be inserted through the penetrations. In the closing position it is thus possible to close locking ring and collar with the aid of a simple plug-in lock, so that the lid can only be opened with a key after removal of the plug-in locking cylinder.

It should here be pointed out that the individual measures described in the dependent claims represent as such, i.e. without back-reference to the independent claim, useful measures and that the applicant reserves himself the right to direct possibly independent claims to said features and that these claims will, in particular, not comprise all features of the independent claim. To be more specific, independently protective features are seen in the features of claims 5, 6 and 7.

The invention shall now be explained and described in detail in the following text in conjunction with the drawings, in which:

DETAILED DESCRIPTION OF THE INVENTION

Figure 1:
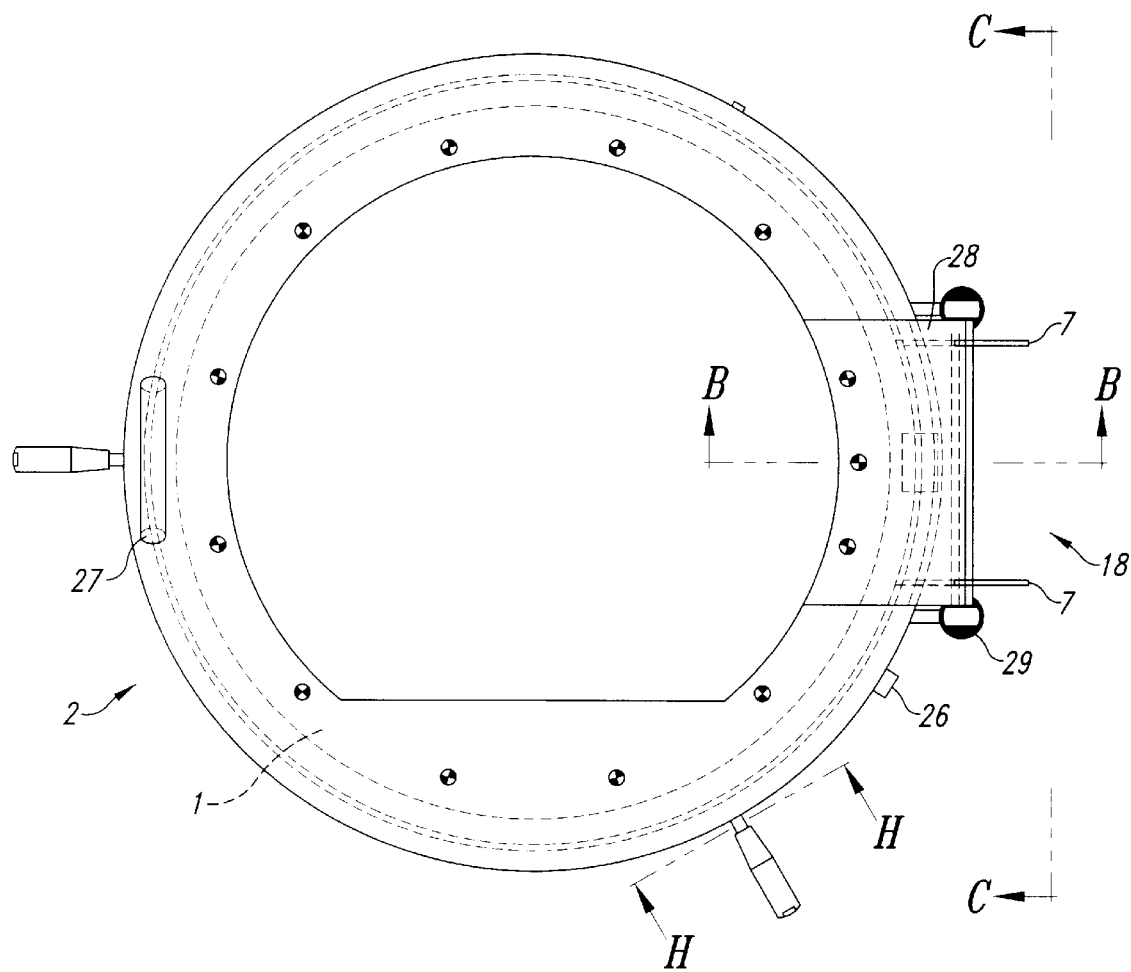
FIG. 1 is a top view on the lid for a manhole opening in a brewing vessel, which is not shown in more detail.

FIG. 1 is a top view showing a lid 2 which is designed according to the invention and which rests on a frame 1 mounted on a brewing vessel (not shown in more detail) and thereby closes a manhole opening through which in the opened state of the lid a maintenance person can enter into the interior of the brewing vessel. Most of the surface area of the lid is formed by an inspection glass which is resistant to pressure and heat and which is connected via an inspection glass frame 11 (FIG. 2) and suitable seals 13 to the lid frame 14.

The lid is pivotably connected via a bearing plate 28 and the bearing 18 to the frame 1 and thus to the brewing vessel. A grip means 27 (FIG. 1) serves opening purposes.

Figure 2:
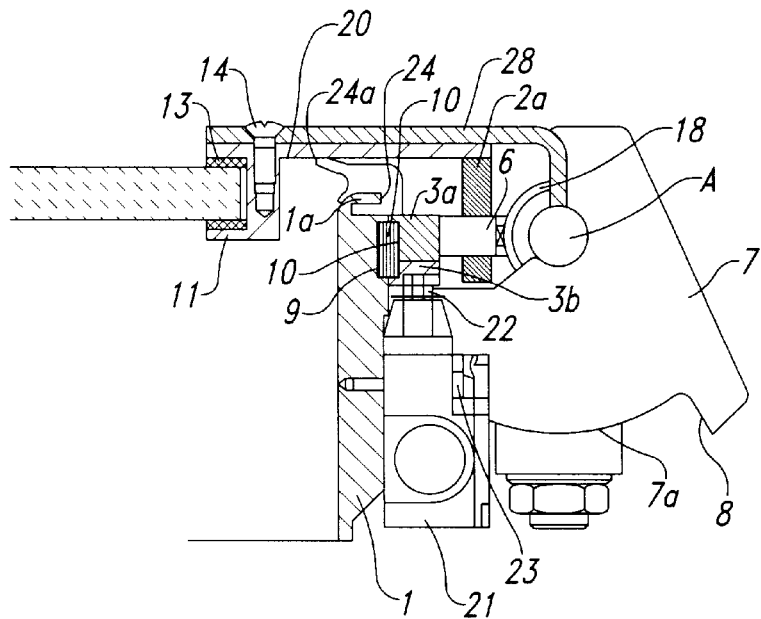
FIG. 2 is a sectional view along section line B—B of FIG. 1, with the locking bolt 6 being turned into the sectional plane.
Figure 3:
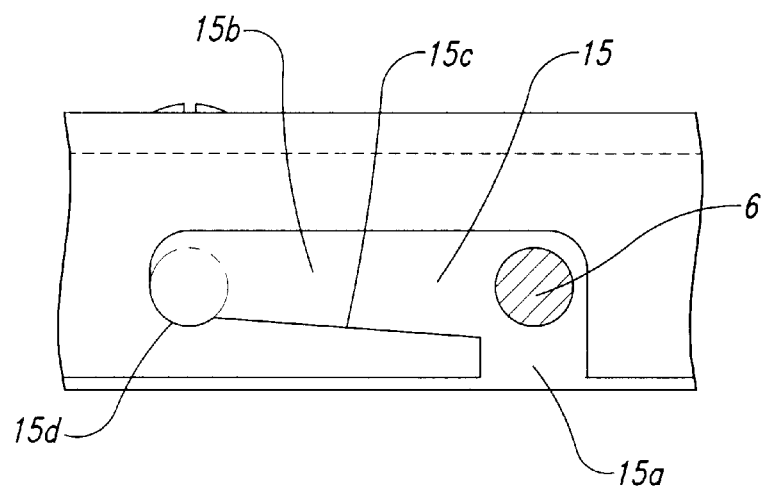
FIG. 3 is an elongated side view taken substantially along line H—H of FIG. 1.
Figure 5:
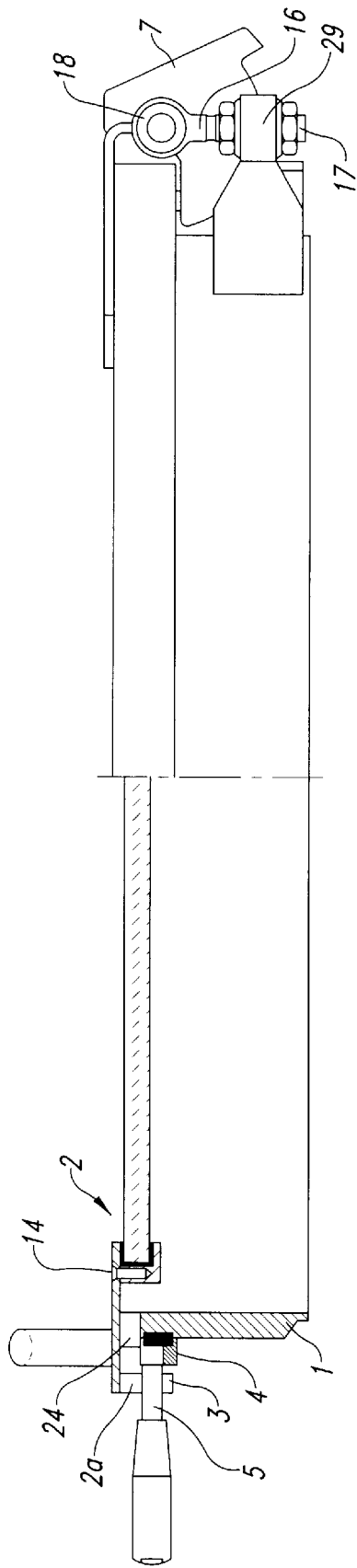
FIG. 5 is a side view of the closed lid, cut in the left half.
Figure 6:
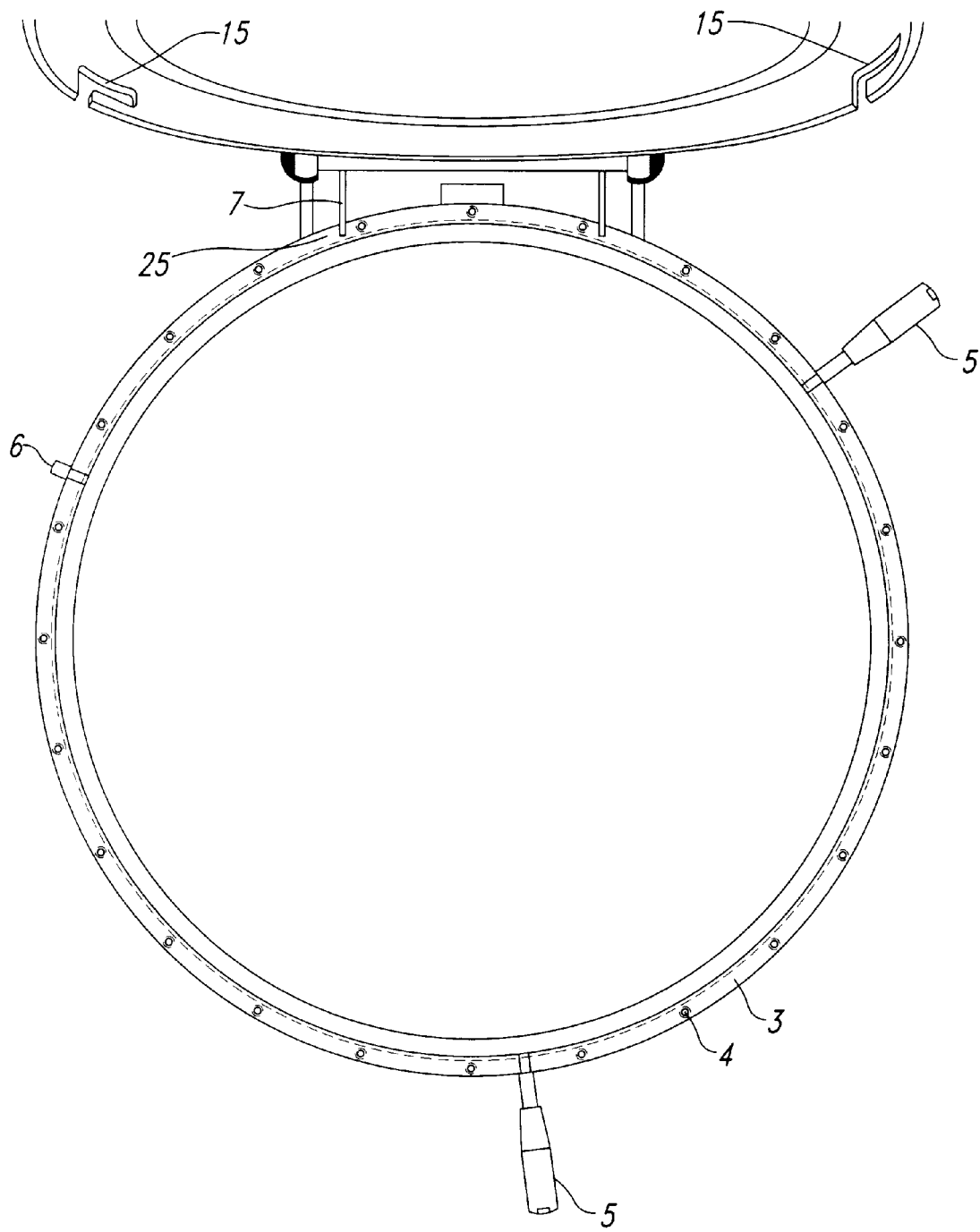
FIG. 6 is a top view on the manhole in the opened state of the lid.

As can be gathered from FIG. 2 together with FIG. 5, the frame 1 is provided on its outside with a surrounding annular groove 9 which has inserted thereinto a bearing ring 20, for instance made of Teflon or of another resistant plastic material. The bearing ring is fixedly received in the annular groove 9 in axial direction and projects with about half its thickness beyond the outer wall of the frame. With the projecting portion the bearing ring 20 engages into a complementary receiving portion 10 which is formed by two rings 3a and 3b. As can be seen in FIG. 2, the two rings 3a and 3b are interconnected via screws 4, thereby forming the locking ring 3 which is thus axially and radially held on the outer wall of the frame and of the bearing ring, respectively, but is rotatably supported in the circumferential direction. Three bolts 6 are mounted on the bearing ring and circumferentially distributed at an angle of 120°, two of the bolts being provided with gripping aids and implemented as handles 5 (cf. FIG. 6). These locking bolts 5, 6 project radially to the outside and cooperate with recesses 15 which are formed on a vertically extending collar 2a of the lid (FIG. 3). The recesses 15 pass from a substantially vertically oriented inlet portion 15a into a locking section 15b which extends substantially horizontally in the circumferential direction and which ends in a locking groove 15d (cf. FIG. 3). The boundary surface 15c which gets into contact with the locking bolt during locking is designed as a slightly ascending ramp so that the contact pressure increases towards the closing position in the locking position, the bolt locks into the locking groove 15d.

Figure 4:
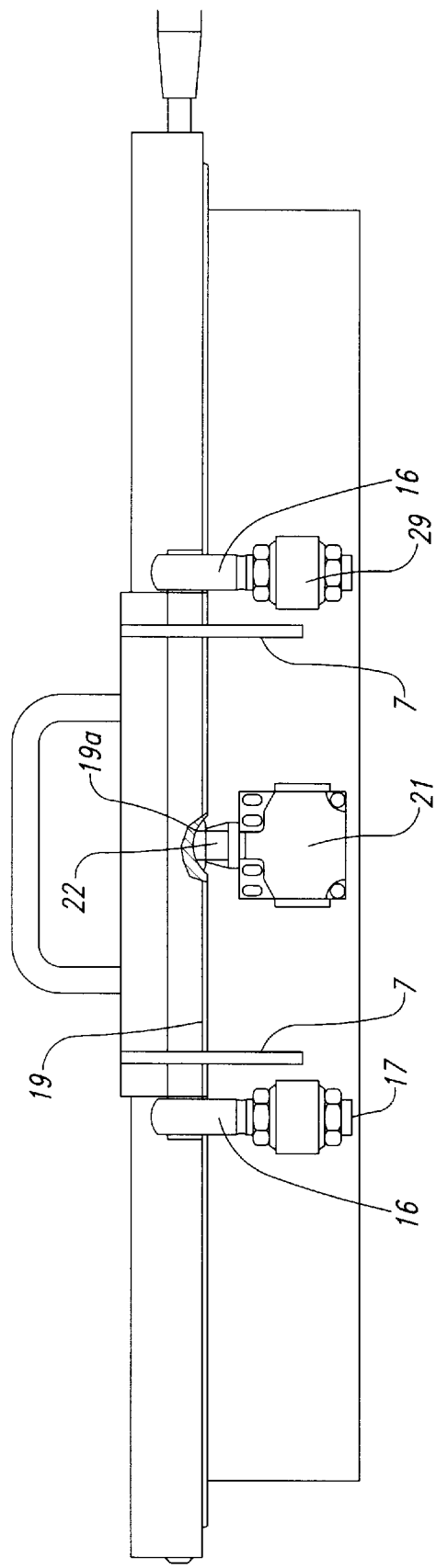
FIG. 4 is a side view taken substantially along line C—C of FIG. 5.

As can particularly be gathered from FIGS. 2 and 4, a limit switch 21 is arranged by means of screws 23 on the frame 1 between the two eye bolts 16 that are secured via nuts 17 to the bearing eyes 29 and thus form the bearing for the lid, the limit switch engaging with a switching pin 22 into a recess 19a at the bottom side of the locking ring 3 (see also FIG. 2.). The distance which must be traveled by the locking ring for actuating the switching pin with the switching surface 19 is shorter than the distance between the locking groove 15d and the inlet portion 15a of the recess 15, so that upon rotation of the ring from the locking position (FIG. 3, shown in broken line) the switch is operated by the switching surface 19 before the ring reaches the opening position with its bolts, in which opening position the bolt comes to rest, as shown in unbroken line in FIG. 3, in the inlet portion 15a, whereby an opening of the lid is made possible. As has not been shown in more detail, the limit switch 21 may be covered by a housing so that it is not freely accessible and can thus not be bridged in violation of safety regulations.

Moreover, as can particularly be gathered from FIG. 2, two (cf. FIG. 4) locking discs 7 which are pivoted together with the lid when the lid is opened are connected to the shaft A about which the lid is pivoted during opening. As can particularly be seen from FIG. 6, the locking ring 3 is provided with penetrations or grooves 25 at points provided accordingly in the locking discs, the penetrations or grooves 25 being positioned in the opening position such that the locking discs engage with their engagement surfaces 7a into said grooves, thereby mechanically preventing rotation of the locking ring 3. On the other hand, since in this position the locking ring depresses the limit switch and thereby ensures that the units in the interior of the brewing vessel are switched off, there is no possibility of bridging the limit switch in some way or other, which considerably enhances safety. It is only when the lid is closed and the locking disc 7 together with its engagement surfaces 7a thereby gets out of engagement with the grooves 25 that the locking ring 3 can be rotated again, so that the limit switch is only switched off again in the locking position.

Moreover, the two locking discs 7 are formed with a stop nose 8 (FIG. 2) which in the opened position of the lid (cf. FIG. 6) comes to rest on the bottom side of the locking ring 3, so that the opening position of the lid is defined thereby.

As can also be gathered from FIG. 2, a sealing profile 24 which acts with a sealing lip 24a on the bottom side of the lid is surroundingly mounted on the upper edge 1a of the frame 1. When the pressure in the interior of the brewing vessel increases, the sealing lip 24a is pressed with an increased sealing force against the bottom side of the lid, thereby performing a reliable sealing operation.

The above-described apparatus functions as follows: In the opening position in which the lid occupies the position shown in FIG. 6, the stop nose 8 rests with its bottom side on the locking ring and prevents the lid from dropping off rearwards. The position is preferably an over-dead center position, so that the weight of the lid holds the lid in the open position. The locking ring 3 is in a position in which the bolts 6 and handles 5 are in alignment with the inlet portions 15a on the collar 2a (FIG. 5) of the lid. The switching surface 19 next to the switching recess 19a (FIG. 4) presses against the switching pin 22 of the limit switch 21, so that all units in the interior are at a standstill. The locking surfaces 7a of the locking disc 7 are positioned in the grooves 25, thereby preventing the locking ring from rotating.

When the lid is to be closed, it can be moved from the open position into the closed position. When approximately the horizontal position is reached, the bolts or handles 5 enter into the inlet portion 15a of the recess 15 and come to rest in the position shown in full line in FIG. 3. As shown in FIG. 5, the locking disc has released the grooves 25 in this position, i.e., they are out of engagement. The limit switch is still operated. The operator can now rotate the locking ring towards the locking position (in FIG. 6 clockwise) by gripping the two handles 5. The bolts 6 are running into the recesses 15 (in FIG. 3 to the left), thereby pressing the lid downwards via the ramp or boundary surface 15c, inter alia, also against the sealing force of the sealing profile 24, until the locking position shown in broken line in FIG. 3 is reached. In this position, the limit switch 21 unlocks and assumes the position which can be seen in FIG. 4. The lid is thereby firmly closed.

A locking cylinder 26 can be inserted into corresponding penetrations which are formed on the locking 3 and the collar 2a and which are in alignment with one another in the locking position and not shown in more detail in the drawing, so that the locking position can be maintained in lockable fashion. If the lid is to be opened after a boiling operation in the interior of the brewing vessel, such an opening action will only be possible when the brewing vessel is substantially pressureless because when the brewing vessel is still under some pressure the lid is pressed by the force of pressure against the bolts in the locking position 15d, and an opening operation is not possible by applying a normal force.

For the opening step the processes take place in the reverse order.

As follows clearly from the explanations regarding the above drawings, the interior of the frame 1 is free from installations, i.e., in other words, unaccessible or hardly accessible spaces or portions in which deposits might form are not created by the locking mechanism in the interior of the frame. The construction is very simple and reliable on the whole. Virtually the whole diameter of the frame 1 is available as inspection area so that an inspection is easily possible even in the closed state of the lid. Operational safety is considerably increased because it is ensured that the limit switch 21 cannot be bridged by avoiding safety regulations and an opening operation is not possible as long as the vessel is still under pressure even if said pressure is small.

We claim:

1. A brewing vessel comprising a frame, a lid, and at least one manhole opening surrounded by said frame and that can be closed with said lid that can be locked with the aid of a locking means, the locking means comprises a rotatable locking ring said locking ring being supported on an outside of said frame and comprises at least one locking bolt that cooperates with a recess formed in a collar of said lid, said locking ring having two interconnectable rings that form a U-shaped receiving portion for a bearing ring located on an outer wall of the frame in a complementary annular groove.

2. A brewing vessel according to claim 1 wherein a surrounding seal is arranged on an edge of said frame at a lid side, and the seal being designed such that a sealing force is increased between the lid and the seal upon an increase in pressure in an interior of the brewing vessel.

3. A brewing vessel according to claim 1 wherein penetrations are in alignment in a locking position, the penetrations are formed in the collar of said lid and in said locking ring with a plug-in locking cylinder being lockably insertable through said penetrations.

4. A brewing vessel according to claim 1 wherein said recess has an inlet portion oriented in a closing direction and is open downwards, and the inlet portion is followed by a closed locking section that is oriented in a circumferential direction.

5. A brewing vessel according to claim 4, wherein said recess has a boundary surface that cooperates with said locking bolt, the boundary surface forms a ramp that slightly ascends towards a locking end position and that ends in a locking recess.

6. A brewing vessel according to claim 1 wherein a limit switch having a switching pin cooperates with the locking ring and is arranged on the outside of the frame.

7. A brewing vessel according to claim 6 wherein said locking ring comprises a switching surface that operates said switching pin upon rotation from a closing position into an opening position before the opening position is reached.

8. A brewing vessel according to claim 1, wherein at least one locking disc is rotatably arranged with said lid during opening and closing, said locking disc comprising a locking surface which in the opening position of said locking ring enters into a groove formed in said locking ring when the lid is being opened and thus blocks a reversed rotation of the rotatable locking ring.

9. A brewing vessel according to claim 8 wherein said locking disc comprises a stop nose that defines a maximum opening position by abutment on a bottom side of the locking ring.

* * * * *